US011937045B2

(12) United States Patent
Horie

(10) Patent No.: US 11,937,045 B2
(45) Date of Patent: Mar. 19, 2024

(54) AUDIO IMAGE CONTROL METHOD, HEADPHONES, AND HEADPHONE ATTACHMENT

(71) Applicant: Toshihiko Horie, Tama (JP)

(72) Inventor: Toshihiko Horie, Tama (JP)

( * ) Notice: Subject to any disclaimer, the term of this patent is extended or adjusted under 35 U.S.C. 154(b) by 306 days.

(21) Appl. No.: 17/295,549

(22) PCT Filed: Nov. 14, 2019

(86) PCT No.: PCT/JP2019/044643
§ 371 (c)(1),
(2) Date: May 20, 2021

(87) PCT Pub. No.: WO2020/110745
PCT Pub. Date: Jun. 4, 2020

(65) Prior Publication Data

US 2022/0132239 A1 Apr. 28, 2022

(30) Foreign Application Priority Data

Nov. 29, 2018 (JP) ................................. 2018-223347
Mar. 28, 2019 (JP) ................................. 2019-062056

(51) Int. Cl.
*H04R 1/34* (2006.01)
*H04R 1/10* (2006.01)
*H04R 5/033* (2006.01)

(52) U.S. Cl.
CPC ........... *H04R 1/345* (2013.01); *H04R 1/1008* (2013.01); *H04R 1/1041* (2013.01); *H04R 5/033* (2013.01)

(58) Field of Classification Search
CPC .... H04R 1/345; H04R 1/1008; H04R 1/1041; H04R 5/033

(Continued)

(56) References Cited

U.S. PATENT DOCUMENTS 3,927,262 A 12/1975 Goeckel
6,817,440 B1 11/2004 Kim
2015/0055814 A1 2/2015 Liu

FOREIGN PATENT DOCUMENTS

CN 205320245 U 6/2016
CN 205336492 U 6/2016

(Continued)

OTHER PUBLICATIONS

Office Action in CN Application No. 201980069696.4, dated Apr. 5, 2023. 12pp.

(Continued)

*Primary Examiner* — Vivian C Chin
*Assistant Examiner* — Con P Tran
(74) *Attorney, Agent, or Firm* — HAUPTMAN HAM, LLP

(57) ABSTRACT

This audio image control method controls the localization of an audio image in a space between a headphone/speaker and the auricle. Rearward sound emitted from the headphone/speaker at a position corresponding to the rear of the auricle and traveling toward the auricle is blocked and reflected to travel away toward the front of the auricle. The reflected rearward sound is reflected together with forward scattering sound emitted from the headphone/speaker at a position forwardly of the auricle and travelling away from the auricle, and is allowed to reach the auricle as reflected forward sound travelling from the front of the auricle toward the auricle. Central sound emitted from the central portion of the headphone/speaker and travelling toward the auricle, and emitted forward sound emitted from the headphone/speaker at a position corresponding to the front of the auricle and traveling toward the auricle are allowed to reach the auricle directly.

15 Claims, 9 Drawing Sheets

(58) Field of Classification Search
USPC .............. 381/309, 310, 74, 17, 300, 335, 87
See application file for complete search history.

(56) References Cited

FOREIGN PATENT DOCUMENTS

| | | | | |
|---|---|---|---|---|
| JP | S5034201 | A | | 4/1975 |
| JP | S5386041 | U | | 7/1978 |
| JP | S57135186 | U | | 8/1982 |
| JP | S58147382 | U | | 10/1983 |
| JP | S58147389 | U | | 10/1983 |
| JP | H715780 | A | | 1/1995 |
| JP | 2000175288 | A | | 6/2000 |
| JP | 2003524971 | A | | 8/2003 |
| JP | 2017103604 | A | * | 6/2017 |
| JP | 2017103604 | A | | 6/2017 |
| JP | 2019165420 | A | | 9/2019 |

OTHER PUBLICATIONS

Isao Mizuno, “Experimental Study of Sound Localization,” Kyoto University, Faculty of Medicine, Department of Otorhinolaryngology, https://www.jstage.jst.go.jp/article/jibirin1925/52/11/52_11_1409/_article/-char/ja/. 25pp.
Kiwami Yoshida et al., “An Experiment on the Directional Localization of sound on the Median Plane” http://www.salesiosp.ac.jp/papers/sotsuken/2006/pdf/documents/ec/4343.pdf#search=%27%E6%AD%A3%E4%B8%AD%E9%9D%A2%E5%86%85%E3%81%AB%E3%81%8A%E3%81%91%E3%82%8B%E9%9F%B3%E3%81%AE%E6%96%B9%E5%90%91%E5%AE%9A%E4%BD%8D%E3%81%AB%E9%96%A2%E3%81%99%E3%82%8B%E5%AE%9F%E9%A8%93%27. 2pp.
International Search Report for International Application No. PCT/JP2019/044643, dated Feb. 4, 2020. 4pp.
Written Opinion in PCT/JP2019/044643, dated Feb. 4, 2020. 13pp.
Extended European Search Report in EP Application No. 19891635.5 dated Jul. 20, 2022, 9pp.
Office Action in JP Application No. 2019-062056, dated Aug. 17, 2021. 7pp.

* cited by examiner

AUDIO IMAGE CONTROL METHOD, HEADPHONES, AND HEADPHONE ATTACHMENT

RELATED APPLICATIONS

The present application is National Phase of International Application Number PCT/JP2019/044643, filed Nov. 14, 2019, and claims priority based on Japanese Patent Application No. 2018-223347 filed Nov. 29, 2018 and Japanese Patent Application No. 2019-062056 filed Mar. 28, 2019.

TECHNICAL FIELD

The present invention relates to an audio image control method for controlling localization of an audio image in a space between a headphone/speaker and an auricle, a headphone to which the method is applied, and a headphone attachment installed on a commercial headphone for controlling the audio image localization.

BACKGROUND ART

The auditory localizing technique applied to the headphone has been disclosed in Patent Literatures 1 to 3.

The headphone as disclosed in Patent Literature 1 is provided with the sound insulator for detouring (diffracting) sound direction. This makes it possible to deviate the audio image from around the center of the head so that the sound can be listened quite naturally.

The headphone as disclosed in Patent Literature 2 is provided with the acoustic reflecting plate at the front part of the acoustic radiation surface to remove the sense of audio image localization overhead, from where the audio image moves forward. This ensures to provide the sense of the auditory localization close to the original sound field as well as spread feeling.

The receiver (headphone) as disclosed in Patent Literature 3 enables the forward auditory localization by slantly erecting the reflection member from a part of a nose-side edge of the periphery of the sounding body (speaker) housing toward the helix direction at a predetermined angle. The reflection member allows the radiated sound to reach the anthelix-side region of the cavity of concha while preventing the radiated sound from reaching the antilobium-side region of the cavity of concha. Alternatively, the receiver enables the forward auditory localization by providing the sound insulator on the upper surface of the sounding body housing. The sound insulator allows the radiated sound to reach the anthelix-side region of the cavity of concha while preventing the radiated sound from reaching the antilobium-side region of the cavity of concha.

Non-Patent Literature 1 discusses one of conclusions, that is, "the sound direction localization is performed most intensively at the position closer to the front, and diffusively at the position closer to the lateral side. The localization becomes intensive again at the diagonal front position at left and right sides." That is, the accurate direction recognition may be acquired from the sound incoming from the front, and the diagonal front positions at left and right sides.

The conclusion discusses that an equilateral triangle formed by a listener and the left/right speakers is the ideal positional relation upon reproduction of the stereophonic sound by the stereo speaker unit. The conclusion also discusses the reason why the audio image of the headphone cannot be point localized. That is, the radiated sound of the headphone is listened at the position just beside the listener so that the sound direction localization becomes diffusive. Accordingly, the headphone fails to perform the point localization as can be done by the speaker.

CITATION LIST

Patent Literature

Patent Literature 1: Japanese Utility Model Laid-Open No. 53-86041

Patent Literature 2: Japanese Utility Model Laid-Open No. 58-147382

Patent Literature 3: Japanese Patent Application Laid-Open No. 2017-103604

Non-Patent Literature 1: "Experimental Study on Sound Direction Localization" Kyoto University, Faculty of Medicine, Department of Otorhinolaryngology, Isao MIZUNO https://www.jstage.jst.go.jp/article/jibirin1925/52/11/52_11_1409/_article/-char/ja/

Non-Patent Literature 2: "Experiment on Sound Direction Localization in Median Plane" Kiwamu YOSHIDA, Mitsunobu MARUYAMA https://www.salesio-sp.ac.jp/papers/sotsuken/2006/pdf/documents/ec/4343.pdf#search=%37%E6%AD%A3%E4%B8%AD%E9%9D%A2%E5%86%85%E3%81%AB%E3%81%8A%E3%81%91%E3%82%8B%E9%9F%B3%E3%81%AE%E6%96%B9%E5%90%91%E5%AE%9A%E4%BD%8D%E3%81%AB%E9%96%A2%E3%81%99%E3%82%8B%E5%AE%9F%E9%A8%93%27

SUMMARY OF INVENTION

Technical Problem

As described above, the equilateral triangle formed by the listener and the left/right speakers is the ideal positional relation for reproducing the stereophonic recording sound source by the stereo speaker unit. In such a case, each of the reproduced sound sources (musical instruments) is audible as a single output sound, that is, the point localized sound.

Meanwhile, headphones have been increasingly used as they offer handiness, which allow listening anywhere and anytime. Especially the headphones have been used by many users who are fond of playing the musical instruments and copying the reproduced music of the instruments from the sound source because the users can feel the reproduced sound through the headphone closer to the sound source than the one reproduced through the stereo speaker unit.

The diaphragms each serving as an acoustic radiation surface of the headphone/speaker are adjacently disposed just beside the left and right sides of the listener. Unlike the case of using the speaker, the respective reproduced sound sources cannot be point localized. Accordingly, the human audibility characteristic makes the listener feel that the reproduced sound is unclear. As a result, the localization of the sound reproduced by the headphone is inaccurate, and the resolution is inferior to that of the sound reproduced by the stereo speaker unit.

As described above, the headphone cannot achieve the point localization nor satisfy the users owing to the inferior audio image resolution to that of the stereo speaker unit. Actually, however, the users still choose the headphones because of handiness and sense of closeness.

The inventor conducted trial listening of the sounds reproduced by the headphones disclosed in Patent Literatures 1 to 3, respectively for examining various acoustic characteristics.

In the examination on the headphone of Patent Literature 1, the auditory localization seemed to be improved by insulating the rearward sound transmitted toward the auricle from the diaphragm at the position to the rear of the auricle. In comparison with the case to which the technique of the present invention is not applied, the high-pitched sound was attenuated to generate a kind of muffled sound. The resultant sound is supposed to be caused by the factor that the central sound transmitted from the diaphragm center toward the auricle has a large content of high-pitched sound which is more unlikely to detour than the middle/low-pitched sounds.

The headphone of Patent Literature 2 is structured to reflect the forward scattering sound radiated toward the front head from the diaphragm at the position to the front of the auricle, and transmitted away from the auricle, and enables the sound to reach the auricle from its front. Although the auditory localization seemed to be improved, the point localization was not achieved as the rearward sound reached the auricle without being insulated. The output sound was kept unclear.

In the examination on the headphone of Patent Literature 3 by reproducing the reflection member, the auditory localization seemed to be improved by utilizing the forward scattering sound. Similar to the Patent Literature 1, in comparison with the case provided with no measures for insulating the central sound as those of the present invention, the high-pitched sound was attenuated to generate a kind of muffled sound.

Additionally, as for reproduction of the insulating member of Patent Literature 3, the improvement in the auditory localization seemed to be less than the case of other Patent Literatures because of no insulation of the rearward sound. Like the reflection member, the insulating member insulates the central sound. As a result, the high-pitched sound was attenuated to generate a kind of muffled sound. Upon reproduction through application of the reflection member and the insulating member simultaneously, the auditory localization was improved in comparison with the case by applying only the reflection member. However, the high-pitched sound was further attenuated to generate the further muffled sound.

After examining the acoustic characteristics of the headphones with various structures, it is found out that generally employed headphones are not necessarily sufficient to perform the point localization of the audio image while maintaining sound quality characteristics. It is concluded that the audio image resolution still needs to be further improved.

In light of the above-described circumstances, it is an object of the present invention to provide the audio image control method, the headphones, and the headphone attachment, which ensure to improve the audio image resolution.

Solution to Problem

The audio image control method according to an aspect of the present invention controls localization of an audio image in a space between a headphone/speaker and an auricle. The method includes the process steps of radiating a sound from a diaphragm as an acoustic radiation surface of the headphone/speaker, and insulating a rearward sound radiated toward the auricle from the diaphragm at a position corresponding to the rear of the auricle to reflect the rearward sound back toward the front of the auricle.

The headphone according to an aspect of the present invention includes an audio image controller for controlling localization of an audio image in a space between a headphone/speaker and an auricle. The audio image controller includes a rear insulating plate for insulating a rearward sound radiated toward the auricle from a diaphragm as an acoustic radiation surface of the headphone/speaker at a position corresponding to the rear of the auricle to reflect the rearward sound back toward the front of the auricle, and a reflecting plate for reflecting the rearward sound reflected by the rear insulating plate, and a forward scattering sound radiated from the diaphragm at a position corresponding to the front of the auricle to be transmitted away from the auricle to guide the rearward sound and the forward scattering sound to the auricle, each as a reflected forward sound toward the auricle from its front.

The headphone attachment according to an aspect of the present invention is installed on a headphone/speaker for controlling localization of an audio image in a space between a headphone/speaker and an auricle. The headphone attachment includes a rear insulating plate for insulating a rearward sound radiated toward the auricle from a diaphragm as an acoustic radiation surface of the headphone/speaker at a position corresponding to the rear of the auricle to reflect the rearward sound back toward the front of the auricle, and a reflecting plate for reflecting the rearward sound reflected by the rear insulating plate, and a forward scattering sound radiated from the diaphragm at a position corresponding to the front of the auricle to be transmitted away from the auricle to guide the rearward sound and the forward scattering sound to the auricle, each as a reflected forward sound toward the auricle from its front.

Advantageous Effects of Invention

The audio image control method, the headphones, and the headphone attachment according to the present invention ensure to improve the audio image resolution.

DESCRIPTION OF EMBODIMENT

Figure 1:
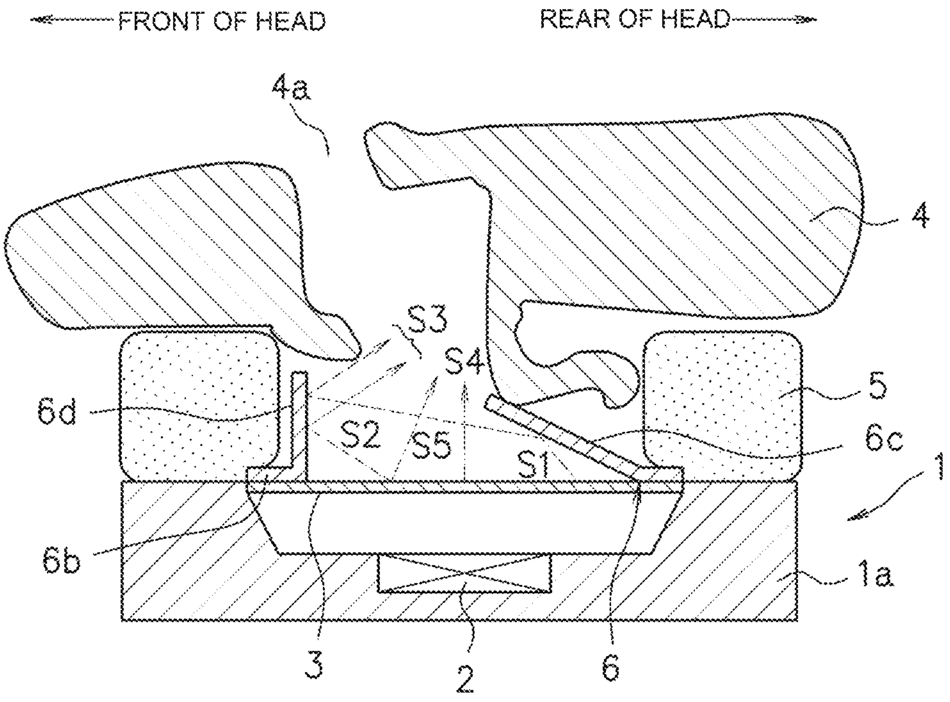
FIG. 1 is a sectional view of a headphone body at a left auricle side along direction passing a center point of a diaphragm for explaining a headphone according to an embodiment of the present invention.

Referring to the drawings, an explanation will be made with respect to an embodiment of the present invention.

Figure 2:
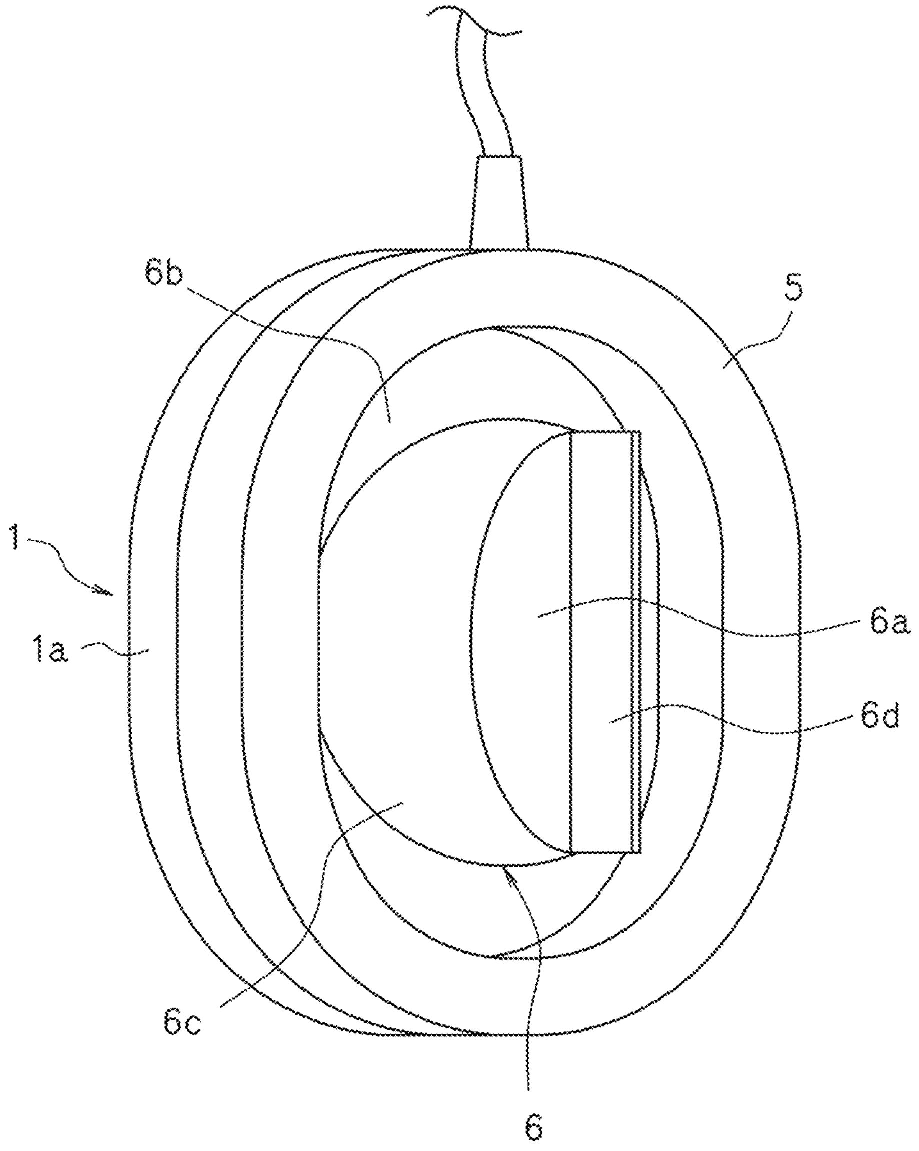
FIG. 2 is a perspective view of the headphone body at the left auricle side for explaining the headphone according to the embodiment of the present invention.

Referring to FIGS. 1 and 2, an explanation will be made with respect to the headphone of the embodiment according to the present invention. FIG. 1 is a sectional view of a headphone body at a left auricle side. FIG. 2 is a perspective view of the headphone body of FIG. 1. Although not illustrated, the headphone body at a right auricle side has the similar structure. A pair of headphone bodies are attached to both ends of a headband via sliders, respectively.

As FIGS. 1 and 2 illustrate, a housing 1*a* of a headphone body 1 has a speaker 2 stored therein. A diaphragm 3 as an acoustic radiation surface of the speaker 2 is disposed on the housing 1*a* at a side of an auricle 4. An earpad 5 is attached to the housing 1*a* at an acoustic radiation surface side while intervening between the headphone body 1 and the auricle 4. An audio image controller 6 for controlling localization of the audio image is disposed in a space between the speaker 2 and the auricle 4.

The audio image controller 6 has its outer periphery shaped corresponding to the diaphragm 3 as the acoustic radiation surface of the speaker 2. The audio image controller 6 has a main body 6*b* which covers a part of the diaphragm in a dome-like shape, and has an opening 6*a* formed from a position corresponding to an area around a center of the auricle to the front thereof. Apart of the main body 6*b* for covering the diaphragm 3 in the dome-like shape, which is located corresponding to the rear of the auricle serves as a rear insulating plate 6*c*. A reflecting plate 6*d* is erected from the main body 6*b* to face the rear insulating plate 6*c* having the opening 6*a* intervened between the reflecting plate 6*d* and the rear insulating plate 6*c*. The rear insulating plate 6*c* insulates a rearward sound S1 radiated toward the auricle 4 from the diaphragm 3 at the position corresponding to the rear of the auricle, and reflects the sound back toward the front of the auricle. The reflecting plate 6*d* reflects the rearward sound S1 reflected by the rear insulating plate 6*c*, and a forward scattering sound S2 radiated from the diaphragm 3 at the position corresponding to the front of the auricle to be transmitted away from the auricle. Those reflected sounds are guided to the auricle 4, each as a reflected forward sound S3 toward the auricle 4 from its front.

A central sound S4 radiated from a center of the diaphragm 3 toward the auricle 4, and a radiated forward sound S5 radiated toward the auricle 4 from the diaphragm 3 at the position corresponding to the front of the auricle are guided directly to the auricle 4 from the opening 6*a*. The reflected forward sounds S3, the central sound S4, and the radiated forward sound S5, which have been guided to the auricle 4 reach an eardrum via an external acoustic meatus 4*a*.

The rear insulating plate 6*c* of the audio image controller 6 covers a part of the opening 6*a* of the main body 6*b* in the dome-like shape, which will be described in detail later referring to FIGS. 3 and 4. The reflecting plate 6*d* is erected on a periphery of the main body 6*b* while having the opening 6*a* intervened therebetween.

In an exemplary case of an earphone having the earpad 5 with its opening shaped by rounding each of four corners of a 30 mm×40 mm rectangle with a circle having a diameter of 30 mm, the main body 6*b* has its shape formed correspondingly, and its size of approximately 60 mm×50 mm. The rear insulating plate 6*c* is disposed inward approximately 10 mm from an outer edge to have its height set to 8 mm so as not to be in contact with the auricle 4. Analogously, the height of the reflecting plate 6*d* is also set to 8 mm. Ideally, the rear insulating plate 6*c* is slanted by extending a descending portion of the sine curve. The use of a linear structure, however, is sufficient to perform the intended function.

Generally, the total weight of the headphone is demanded to be reduced for the purpose of lowering the load applied when it is worn. The speaker grille made of lightweight material with sufficient strength serves to protect the diaphragm. The audio image controller 6 is also demanded to have similar properties. The use of the material having flexibility and strength balanced for producing the audio image controller has been proposed, for example, the thermoplastic resin such as polypropylene and polystyrene.

The audio image controller 6 itself may be used as a headphone attachment. It may be installed on the commercial headphone to control audio image localization in the space between the headphone/speaker and the auricle. The headphone attachment has its outer periphery corresponding to the diaphragm 3 as the acoustic radiation surface of the commercial headphone. It is held by inserting the outer periphery of the main body 6*b* between the diaphragm 3 and the earpad 5.

When using the audio image controller as the headphone attachment, it has to be processed corresponding to each shape of various types of earpads of the commercial headphone. In order to make the attachment adaptable to the shape or size of the earpad and the housing, it is preferable to form a margin area to be cut at least partially in the outer periphery of the main body 6*b*. In such a case, the margin area has to be easily cut by the simple tool for household use such as scissors, and yet have its thickness with sufficient durability. It is preferable to use polystyrene for producing the headphone attachment.

An explanation will be made with respect to the audio image control method for controlling the audio image localization in the space between the headphone/speaker and the auricle in the above-described structure.

Referring to FIG. 1, the rearward sound S1 is transmitted to the front of the auricle from the rear insulating plate 6*c*, and is reflected by the reflecting plate 6*d*. The sound is then localized for accurate sound direction recognition. The forward scattering sound S2 is reflected by the reflecting plate 6*d*, and becomes the localized sound. The opening 6*a* allows the central sound S4 and the radiated forward sound S5 to directly reach the auricle without being insulated.

The opening 6*a* is formed in afoot portion of the reflecting plate 6*d* while having the width narrowed toward the rear head side. The rear insulating plate 6*c* is erected from a gap formed in the earpad 5 for reflecting the rearward sound S1 toward the front head direction. The vertical distance between the rear insulating plate 6*c* and the center of the diaphragm 3 at its center has to be maximized. Accordingly, the opening has the dome-like shape having the front head side opened.

In the audio image control method according to the present invention, the rearward sound S1 radiated toward the auricle 4 from the diaphragm 3 at the position corresponding to the rear of the auricle is insulated as it is a non-localized sound for diffusing the sound direction localization so that the sound does not reach the auricle.

The method serves to reflect the rearward sound S1 reflected to the front of the auricle, and the forward scattering sound S2 radiated from the diaphragm 3 at the position corresponding to the front of the auricle toward the front head direction so as not to reach the auricle 4. Each of those sounds becomes the reflected forward sound S3 which reaches the auricle 4 from its front. The resultant sound is then used as the localized sound.

The method allows the central sound S4 as the non-localized sound, which has a large content of high-pitched sound and is effective for keeping sound quality in use, and the radiated forward sound S5 as the localized sound to which the sound direction localization is intensified, which is radiated toward the auricle from the diaphragm at the position corresponding to the front of auricle to reach the auricle without being insulated.

The method allows sound control operations using the non-localized sound which contains the high-pitched sound as well as the sound derived from localizing the non-localized sound.

The rear insulating plate 6*c* serves to insulate the rearward sound S1 to be reflected toward the front of auricle. The reflecting plate 6*d* serves to reflect the reflected rearward sound S1 and the forward scattering sound S2 so that those sounds reach the auricle 4, each as the reflected forward sound S3, and further allows the central sound S4 and the radiated forward sound S5 to reach the auricle 4 from the opening 6*a* without being insulated. The sound control is executed through the method and the mechanism as described above.

The foregoing audio image control method is applied to the structure and the headphone attachment, which are disposed in the space between the headphone/speaker and the auricle. This makes it possible to perform the audio image point localization while keeping the sound quality characteristics of the headphone, thus improving the audio image resolution.

In the foregoing structure, sound components of each of the unclear sound sources (for example, musical instruments) are integrated into a single point, that is, point localized. In addition to the sense of separation from sound components of other musical instruments, the point localization of the frequency component of the sound source improves the audio image resolution. It is possible to make the sound audible as the one approximated to the original sound of the musical instrument. As for singing sounds, it is possible to clarify voice quality and singing technique as well as recognize uniqueness of the individual singer.

The user who tries to copy the sounds will come to catch the fine nuance of the player's playing style as well as rhythm and syncopation. The embodiment gives chances to the listener to perceive more sound details compared with the case to which the present invention has not been applied.

Performing the point localization of the instrument sound allows the user to receive acoustic effects upon listening of general musical pieces, for example, perception of transparency of the entire reproduced sound, and sophistication of ensembles. The reverberation sound becomes no longer unclear. Especially in the case of classical music, the listener has a sense of natural echo specific to the recording hall. In the case of the sound recorded in the studio, the listener grasps the spatial expression intended by the producer.

The present invention in the form of the acoustic reproduction device as the headphone allows listening and appreciation of sounds which are equivalent to those reproduced by the speaker by improving the audio image resolution while keeping the handiness.

A detailed explanation will be made with respect to the reason why the point localization improves the audio image resolution.

There is only one sound source in the natural world. The direction recognition in listening is performed in accordance with the differential arrival time caused by the difference in the distance between the sound source and the left/right auricles.

Upon reproduction of the stereo sound source, the same sound source is reproduced at both left and right sides simultaneously with the same sound volume so that the center localization is performed for singing, for example. The center localization is performed through the artificial process of addition and synthesizing of sounds, which cannot be derived from the natural world.

In the state where the stereo speaker units are disposed at left and right sides in front of the listener, the audio image will be localized on the left and the right sides separately from the center as the volume difference between the left and the right speakers occurs.

The study on listening characteristics has revealed that sounds diagonally transmitted to the listener from the left and right sides respectively in front of the listener allows the direction recognition with the highest accuracy. Ideally, in general, the speakers are arranged so that each line diagonally extending from the listener to the left/right speakers forms an angle of 30° to an axis from the listener to the center of the left/right speakers.

In the case of stereo reproduction using the headphone, because of the built-in speakers adjacent to face the left and the right auricles, the sounds are listened from the right beside the listener. However, regarding the listening characteristics, such sound makes the direction recognition inaccurate (see Non-Patent Literature 1). Unlike the case of the speakers, addition and synthesizing of left and right sounds cannot be performed accurately. As a result, the sound source is not localized to the single point, and split.

Furthermore, frequency may cause dispersion in the direction recognition (see Non-Patent Literature 2) so that the split sound may further be diffused.

When describing the foregoing circumstances from a visual aspect, the sound reproduced by the headphone gives the sense of seeing something from a distance with mild astigmatic and nearsighted eyesight compared with the sound reproduced by the speakers. The audio image is listened as being overlapped and unclear.

According to the present invention, in the case where the audio image is converged into the single point, that is, the point localization is performed, the audio image may be integrated to be compact, and unclearness owing to frequency may also be eliminated. This makes it possible to reproduce the sound with fidelity to the original sound to be listened as the familiar musical instrument sound. It is also possible for the listener to appreciate more detailed nuance of the musical performance. Effects of the original sound reproduction and sound separation allow easy listening discrimination among those of the musical instruments in spite of the sound sources localized at the same position.

Conventionally, although echo has been grasped with rough sense before, the invention allows the listener to listen each echo of the respective musical instruments discriminatedly, leading to listenability with respect to spatial conditions and expression of the music as a whole. This allows the listener to appreciate the music more deeply.

In addition to closeness to the sound source as the feature of the headphone, the point localization allows the listener to carry out acoustic observation using a magnifier in terms of visual perception. This allows the listener to perceive detailed nuance of, for example, the vocal sounds such as vocalization, loudness, and breathing pause, percussive sounds reminding the drum set arrangement, the drum stick handling, and speed and spreading of reverberant sounds added to hammering sound, and bass guitar sounds reminding fingering technique of the player.

Meanwhile, the point localization allows sound energy to be densified, low-pitched sounds of the bass guitar and the bass drum to improve the sense of rhythm, the sound source of the snare drum for producing clear sounds to sharply express the sound rise-up and attenuation, and string instrument to generate steady harmonic sounds from frictional sounds, which are not only voluminous but also rich in expression.

Additionally, as an extra profit from the sound separation, perception of the presence may be improved, for example, the sense of clear and real breathing of the performer, and the reverberation and real hand clapping in the live recording.

The present invention ensures to impart the performance higher than that of the speaker to the headphone in the limited application for monitors.

The present invention is not limited to the embodiment as described above, but may be variously modified so long as it does not deviate from the scope of the invention.

First Modified Example

Figure 3:
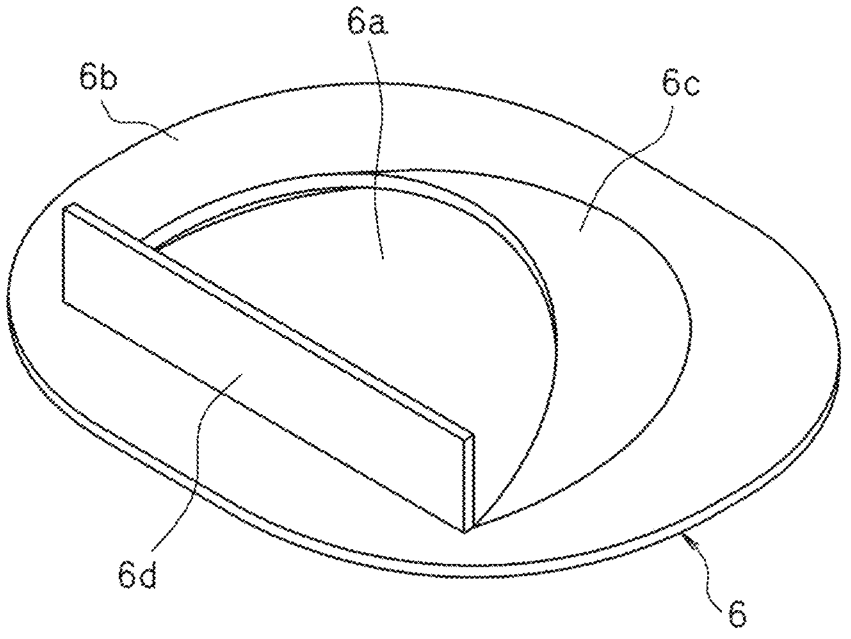
FIG. 3 is a perspective view of an example of a structure of an audio image controller as illustrated by FIG. 1.
Figure 4:
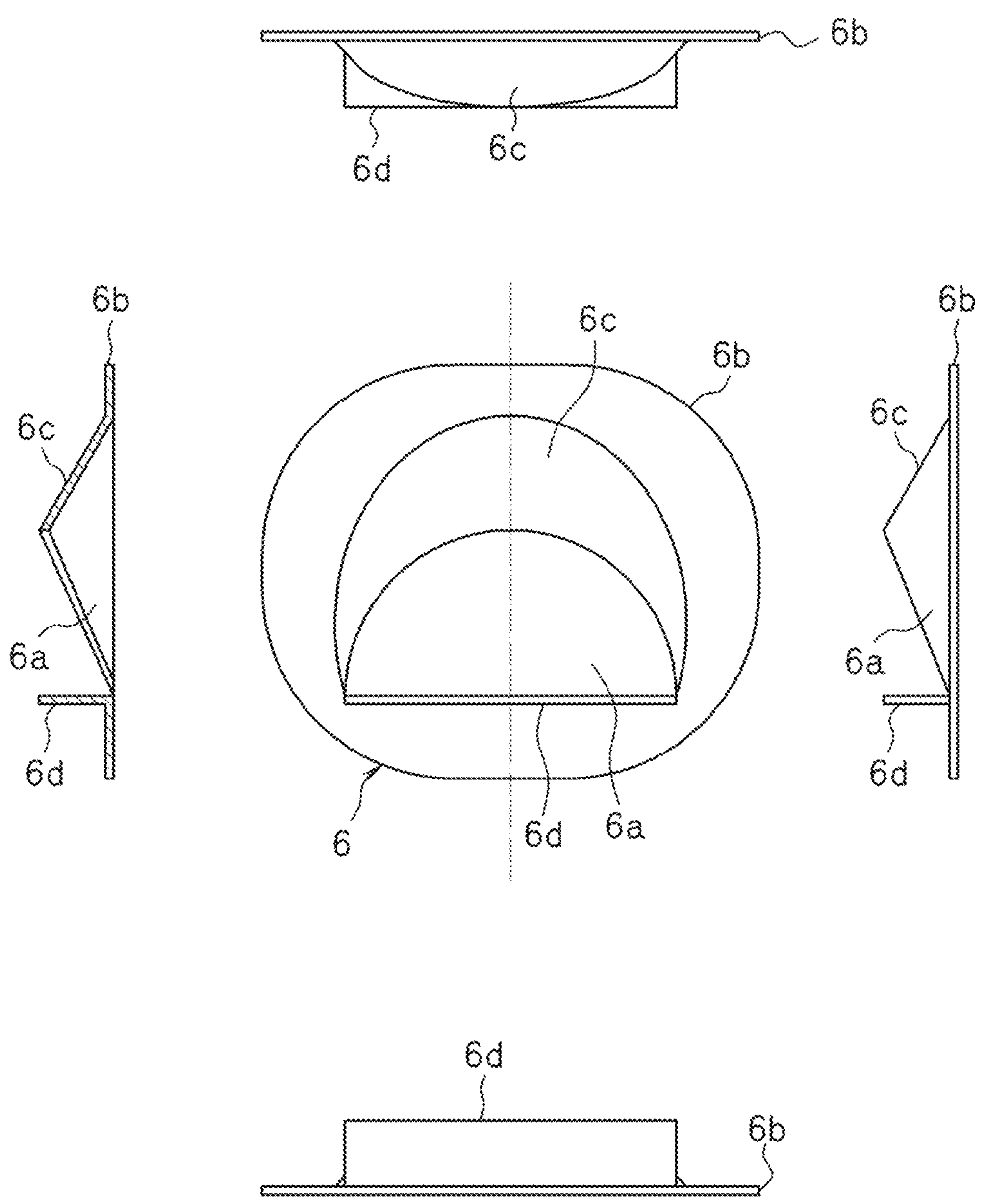
FIG. 4 represents a plan view, a front view, a back view, a left side view, and a right side view of the structure as illustrated by FIG. 3.
Figure 5:
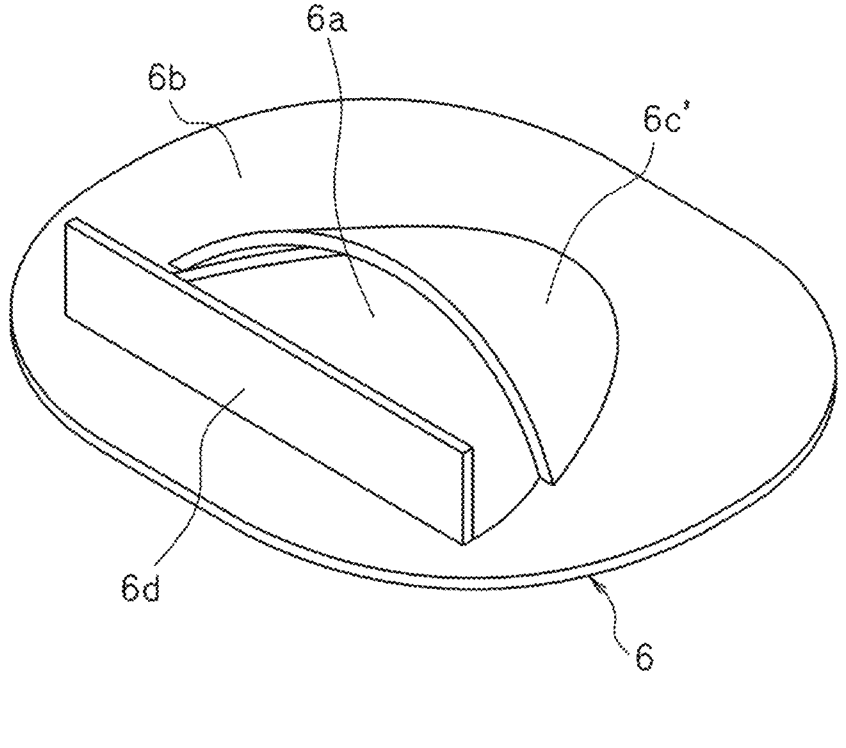
FIG. 5 is a perspective view of another example of a structure of the audio image controller as illustrated by FIG. 1.

As FIG. 3 illustrates, the rear insulating plate 6*c* has its upper edge gradually coming in contact with the reflecting plate 6*d*. However, the use of a half-dome shaped rear insulating plate 6*c*' as illustrated by FIG. 5 provides the substantially similar effect to the one derived from the embodiment.

Second Modified Example

Figure 6A:
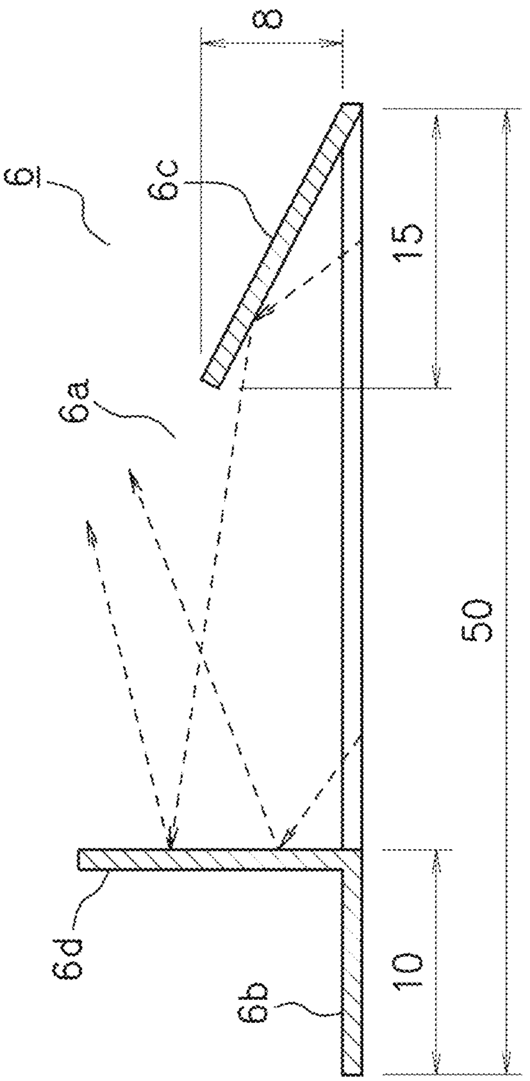
FIG. 6A is a sectional view of an example of the structure of the audio image controller as illustrated by FIG. 1.
Figure 6B:
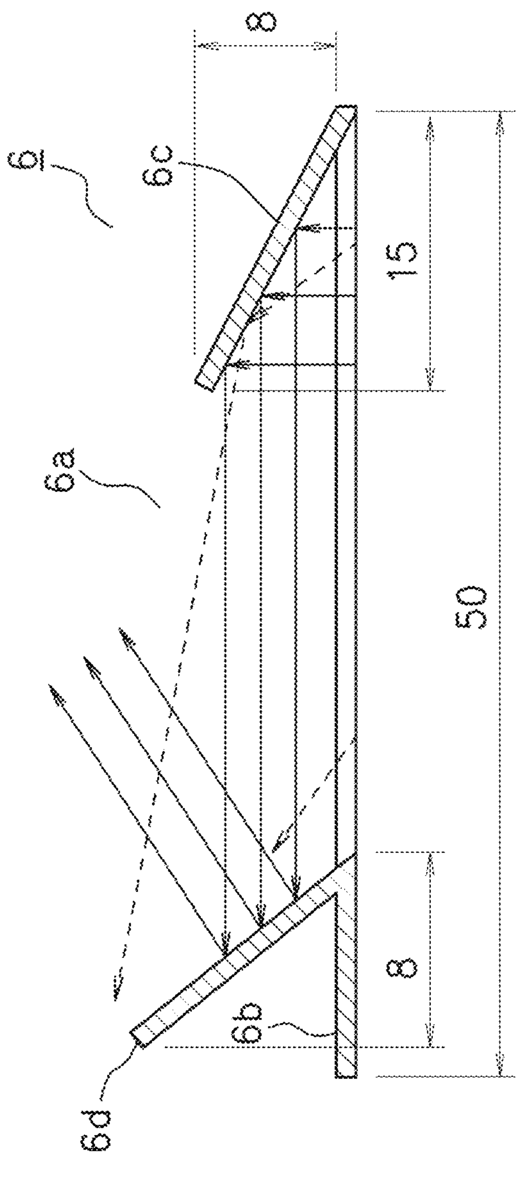
FIG. 6B is a sectional view of another example of a structure of the audio image controller as illustrated by FIG. 1 in comparison with FIG. 6A.

FIG. 6A is a sectional view of an example of the structure of the audio image controller as illustrated by FIG. 1. FIG. 6B is a sectional view of another example of a structure of the audio image controller as illustrated by FIG. 1 in comparison with FIG. 6A. In the embodiment, the reflecting plate 6*d* is erected from the main body 6*b* at approximately 90° as illustrated by FIG. 6A. However, the erecting angle of the reflecting plate 6*d* is not limited to 90°. In the experiment conducted by the inventor, the angle of the reflecting plate 6*d* was laid down forward of the auricle at a slant angle of approximately 60°, resulting in an impression of improved localization.

Numerical values denoted by arrows in FIGS. 6A and 6B indicate the respective sizes of the audio image controller in the experiment, which are expressed in mm.

Among sounds radiated from the diaphragm to the rear of the auricle, the sound reflected by the reflecting plate 6*d* to reach the auricle from its front is considered to be the straight advancing sound radiated perpendicularly to the diaphragm surface as indicated by solid lines. Meanwhile, the slanting sound which slants with respect to the plane perpendicular to the diaphragm surface as indicated by broken line represents the air-borne spread of the straight advancing sound. It is clear that the volume of the straight advancing sound directly generated by the horizontal motion of the diaphragm is higher than that of the slanting sound as it is experimentally felt that the volume listened in front of the speaker unit is higher than the volume listened at the laterally displaced positions. It is presumed that setting of the slant contributes to improvement in the sound localization.

Then angle of the reflecting plate 6*d* may be set in accordance with the required acoustic characteristics and listeners. It is also possible to make the angle variable. Similarly, the slanting angle of the rear insulating plate 6*c* is not limited to the angle (structure) of the embodiment as described above, but may be set in accordance with the required acoustic characteristics.

Third Modified Example

Focusing on the sound reflection efficiency for improving sound quality, the reflecting plate 6*d* may be made of metal. In the experiment conducted by the inventor, in the absence of specific measures, the expression of the violin performance was felt as the nuance like symbolic logic. On the contrary, when using the resin reflecting plate to which the present invention has been applied, harmonic sound (high-pitched sound) is generated through the point localization, resulting in the auditory sense enough to remind the listener of the bowing (arm action of the player). The metal reflecting plate instead of the resin reflecting plate allows improvement in localization and increase in harmonic sound, bringing the frictional sound of the bow (friction between bow and string) close to the original sound. The use of the metal reflecting plate ensures to improve auditory impressions both in localization and sound quality significantly higher than those in the case of using the resin reflection plate.

When using the metal reflecting plate, safety measures may be taken by rounding ends and corners to be possibly in direct contact with auricles of the listener, or by covering such ends and corners with soft material like rubber. The similar effect may be obtained by adhering the metal plate to the reflecting surface of the resin reflecting plate 6*d*.

Fourth Modified Example

Figure 7A:
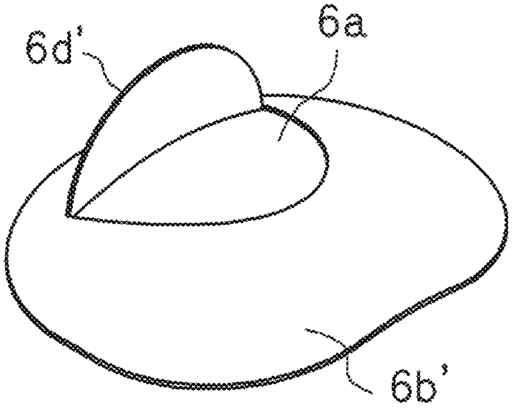
FIG. 7A is a perspective view of another example of a structure of the audio image controller as illustrated by FIG. 1.
Figure 7B:
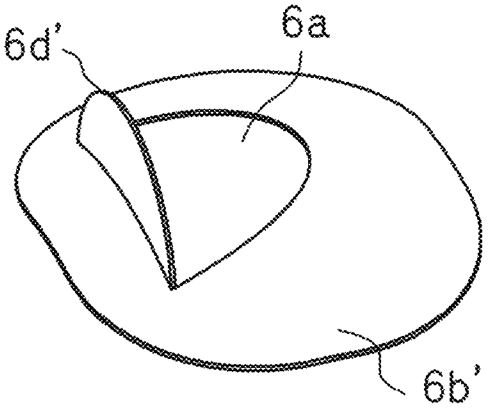
FIG. 7B is a perspective view of another example of the structure of the audio image controller as illustrated by FIG. 1 when seen from the direction different from the one as illustrated by FIG. 7A.

FIGS. 7A and 7B are perspective views of another exemplary structure of the audio image controller 6 as illustrated by FIG. 1 when seen from different directions. In the fourth modified example, an outer periphery of the main body 6*b*' of the audio image controller 6 has its shape corresponding to the diaphragm 3 for covering the diaphragm 3 in the dome-like shape. The main body 6*b*' has the opening 6*a* formed from the position corresponding to an area around the center of the auricle to the front thereof. The part of the main body 6*b*', which is located corresponding to the diaphragm 3 at the position to the rear of the auricle serves as the rear insulating plate 6*c*. The reflecting plate 6*d*' has an arc-like shape while erecting from the main body 6*b*' having the opening 6*a* intervened between the reflecting plate 6*d*' and the main body 6*b*'.

The above-structured audio image controller provides substantially similar effects to those described in the embodiment and the first to the third modified examples. In the structure, the uppermost portion of the arc is opposed to a cavity of the auricle (external acoustic meatus) so as to suppress its contact with the auricle for securing safety. By making the reflecting plate 6*d*' into the arc shape, the volume of the sound reflected from the center may be increased to be higher than the volume obtained in the case of using the rectangular reflecting plate 6*d*.

Fifth Modified Example

Figure 8A:
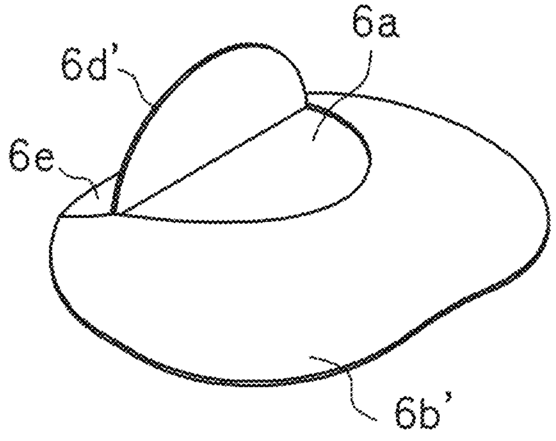
FIG. 8A is a perspective view of still another example of a structure of the audio image controller as illustrated by FIG. 1.
Figure 8B:
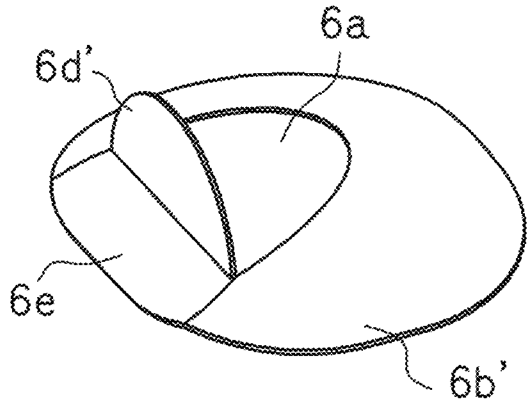
FIG. 8B is a perspective view of still another example of the structure of the audio image controller as illustrated by FIG. 1 when seen from the direction different from the one as illustrated by FIG. 8A.

FIGS. 8A and 8B are perspective views of another exemplary structure of the audio image controller 6 as illustrated by FIG. 1 when seen from different directions. In the fifth modified example, an outer periphery of the main body 6*b*' of the audio image controller 6 has its shape corresponding to the diaphragm 3 for covering the diaphragm 3 in the dome-like shape. A partial region 6*e* of the main body 6*b*' in contact with the reflecting plate 6*d*' has a flat surface.

Other structures are similar to those of the fourth modified example as illustrated by FIGS. 7A and 7B. Accordingly, the same elements will be denoted by the same codes, and explanations thereof, thus will be omitted.

Even if the partial region 6*e* of the dome-like main body 6*b*' has the flat surface, the effects similar to those derived from the embodiment and the first to the fourth modified examples may be obtained. Like the fourth modified example, the uppermost portion of the arc is opposed to the cavity of the auricle (external acoustic meatus) so as to suppress its contact with the auricle for securing safety. By making the reflecting plate 6*d*' into the arc shape, the volume of the sound reflected from the center may be increased to be higher than the volume obtained in the case of using the rectangular reflecting plate 6*d*.

Sixth Modified Example

In the embodiment and the first to the fifth examples, explanations have been made with respect to an exemplary case in which the audio image controller 6 is integrally formed. However, multiple components may be combined to form the audio image controller so long as functions of the rear insulating plate 6*c*, the reflecting plate 6*d*, and the opening 6*a* may be performed, respectively. It is possible to have some part of the housing 1*a* serving as the rear insulating plate 6*c* or the reflecting plate 6*d*, and integrate the rear insulating plate 6*c* and the reflecting plate 6*d*.

An explanation will be made with respect to technical ideas derived from the embodiment and the first to the sixth modified examples of the audio image control method, the headphone, and the headphone attachment.

The audio image control method according to an aspect controls localization of an audio image in a space between the headphone/speaker and the auricle. The method includes the process steps of: insulating the rearward sound radiated toward the auricle from the diaphragm as the acoustic radiation surface of the headphone/speaker at a position corresponding to the rear of the auricle to reflect the rearward sound back toward the front of the auricle; reflecting the reflected rearward sound, and the forward scattering sound radiated from the diaphragm at a position corresponding to the front of the auricle to be transmitted away from the auricle to guide the rearward sound and the forward scattering sound to the auricle, each as a reflected forward sound toward the auricle from its front; and guiding the central sound radiated from the center of the diaphragm toward the auricle, and the radiated forward sound radiated from the diaphragm at a position corresponding to the front of the auricle toward the auricle directly to the auricle.

The audio image control method allows the audio image to obtain point localization using the non-localized sound which contains the high-pitched sound as well as the sound derived from localizing the non-localized sound while keeping sound quality characteristics of the headphone. This makes it possible to improve the resultant audio image resolution.

The headphone according to another aspect includes the audio image controller for controlling localization of the audio image in the space between the headphone/speaker and the auricle. The audio image controller includes: the rear insulating plate for insulating the rearward sound radiated toward the auricle from the diaphragm as the acoustic radiation surface of the headphone/speaker at the position corresponding to the rear of the auricle to reflect the rearward sound back toward the front of the auricle; and the reflecting plate for reflecting the rearward sound reflected by the rear insulating plate, and the forward scattering sound radiated from the diaphragm at the position corresponding to the front of the auricle to be transmitted away from the auricle to guide the rearward sound and the forward scattering sound to the auricle, each as the reflected forward sound toward the auricle from its front. The central sound radiated from the center of the diaphragm toward the auricle, and the radiated forward sound radiated toward the auricle from the diaphragm at the position corresponding to the front of the auricle are directly guided to the auricle.

The above-structured headphone allows the audio image to obtain point localization using the non-localized sound which contains the high-pitched sound as well as the sound derived from localizing the non-localized sound while keeping sound quality characteristics of the headphone. This makes it possible to improve the resultant audio image resolution.

In another preferred aspect, the audio image controller includes the main body having its outer periphery corresponding to the diaphragm to cover the part of the diaphragm in the dome-like shape, and the opening formed from the position corresponding to the area around the center of the auricle to its front. The part of the main body at the position corresponding to the rear of the auricle for covering the diaphragm in the dome-like shape serves as the rear insulating plate. The reflecting plate is erected from the main body, having the opening intervening between the reflecting plate and the main body.

The part of the diaphragm at the position corresponding to the rear of auricle is used as the rear insulating plate to simplify the structure. The structure insulates the rearward sound toward the auricle, and effectively reflects the sound back toward the front of the auricle.

The headphone attachment according to another aspect is installed on the headphone/speaker for controlling localization of the audio image in the space between the headphone/speaker and the auricle. The headphone attachment includes: the rear insulating plate for insulating the rearward sound radiated toward the auricle from the diaphragm as the acoustic radiation surface of the headphone/speaker at the position corresponding to the rear of the auricle to reflect the rearward sound back toward the front of the auricle; and the reflecting plate for reflecting the rearward sound reflected by the rear insulating plate, and the forward scattering sound radiated from the diaphragm at the position corresponding to the front of the auricle to be transmitted away from the auricle to guide the rearward sound and the forward scattering sound to the auricle, each as the reflected forward sound toward the auricle from its front. The headphone attachment guides the central sound radiated from the center of the diaphragm toward the auricle, and the radiated forward sound radiated toward the auricle from the diaphragm at the position corresponding to the front of the auricle directly to the auricle.

The above-structured headphone attachment installed on the commercial headphone allows operations for controlling the audio image localization of the headphone audio image. This allows the audio image to obtain point localization using the non-localized sound which contains the high-pitched sound as well as the sound derived from localizing the non-localized sound while keeping sound quality characteristics of the headphone. This makes it possible to improve the resultant audio image resolution.

In still another preferred aspect, the headphone attachment includes the main body having its outer periphery corresponding to the diaphragm to cover the part of the diaphragm in the dome-like shape, and the opening formed from the position corresponding to the area around the center of the auricle to its front. The part of the main body at a position corresponding to the rear of the auricle for covering the diaphragm in the dome-like shape serves as the rear insulating plate. The reflecting plate is erected from the main body, having the opening intervening between the reflecting plate and the main body.

The part of the diaphragm at the position corresponding to the rear of auricle is used as the rear insulating plate to simplify the structure. The structure insulates the rearward sound toward the auricle, and effectively reflects the sound back toward the front of the auricle.

Additionally, in another preferred aspect, the margin region is formed on the outer periphery of the main body, having at least partially cut in accordance with the size of the commercial headphone.

At least a part of the margin region on the outer periphery of the main body is cut in accordance with the size of the commercial headphone. This ensures to easily make the headphone attachment adaptable to the commercial headphone.

In another preferred aspect, the main body is held through insertion between the diaphragm and the earpad.

The headphone attachment is installed by inserting and holding the main body between the diaphragm and the earpad. This ensures to easily install the headphone attachment on the commercial headphone.

REFERENCE SIGNS LIST

1: headphone body,
1*a*: housing,
2: speaker (headphone/speaker),
3: diaphragm,
4: auricle,
4*a*: external acoustic meatus,
5: earpad,
6: audio image controller (headphone attachment),
6*a*: opening,
6*b*, 6*b*': main body,
6*c*: rear insulating plate,
6*d*, 6*d*': reflecting plate,
6*e*: partial region,
S1: rearward sound,
S2: forward scattering sound,
S3: reflected forward sound,
S4: central sound,
S5: radiated forward sound

The invention claimed is:

1. An audio image control method for controlling localization of an audio image in a space between a headphone/speaker and an auricle of a user using the headphone/speaker, the audio image control method comprising:

surrounding the auricle by an earpad of the headphone/speaker;

radiating a sound from a diaphragm as an acoustic radiation surface of the headphone/speaker;

insulating a rearward sound radiated toward the auricle from the diaphragm at a rear of the auricle and reflecting, by a rear insulating plate, the rearward sound back toward a front of the auricle, wherein the front of the auricle is defined as a side with a face of the user, and the rear insulating plate is disposed within an inner periphery of the earpad at a first position between the rear of the auricle and the diaphragm, inclined with respect to the diaphragm, and configured to reflect the rearward sound toward the front of the auricle; and reflecting, by a reflecting plate, the reflected rearward sound reflected by the rear insulating plate to an external acoustic meatus of the auricle, wherein the reflecting plate is disposed within the inner periphery of the earpad at a second position between the front of the auricle and the diaphragm, and configured to reflect the reflected rearward sound reflected by the rear insulating plate to the external acoustic meatus.

2. The audio image control method according to claim 1, further comprising:

reflecting a forward scattering sound radiated from the diaphragm at the front of the auricle to be transmitted away from the auricle, and guiding each of the reflected rearward sound and the reflected forward scattering sound, as a reflected forward sound, toward the external acoustic meatus of the auricle from the front of the auricle.

3. The audio image control method according to claim 1, further comprising:

guiding (i) a central sound radiated from a center of the diaphragm toward the auricle, and (ii) a radiated forward sound radiated from the diaphragm at the front of the auricle toward the auricle directly to the external acoustic meatus of the auricle.

4. The audio image control method according to claim 1, further comprising:

reflecting a forward scattering sound radiated from the diaphragm at the front of the auricle to be transmitted away from the auricle;

guiding each of the reflected rearward sound and the reflected forward scattering sound, as a reflected forward sound, toward the external acoustic meatus of the auricle from the front of the auricle; and guiding (i) a central sound radiated from a center of the diaphragm toward the auricle, and (ii) a radiated forward sound radiated from the diaphragm at the front of the auricle toward the auricle directly to the external acoustic meatus of the auricle.

5. The audio image control method according to claim 1, wherein the diaphragm extends in a first direction, the reflecting plate is erected in a second direction perpendicular to the first direction, and the rear insulating plate overlaps (a) the diaphragm in the second direction and (b) the reflecting plate in the first direction.

6. A headphone, comprising:

an audio image controller configured to control localization of an audio image in a space between a headphone/speaker and an auricle of a user using the headphone/speaker;

a diaphragm; and an earpad configured to surround the auricle; wherein the audio image controller includes:

a rear insulating plate disposed within an inner periphery of the earpad to be at a first position between a rear of the auricle and the diaphragm, inclined with respect to the diaphragm, and configured to insulate a rearward sound radiated toward the auricle from the diaphragm as an acoustic radiation surface of the headphone/speaker at the rear of the auricle, and reflect the rearward sound back toward a front of the auricle, wherein the front of the auricle is defined as a side with a face of the user; and a reflecting plate disposed within the inner periphery of the earpad to be at a second position between the front of the auricle and the diaphragm, and configured to reflect (i) the reflected rearward sound reflected by the rear insulating plate, and (ii) a forward scattering sound radiated from the diaphragm at the front of the auricle to be transmitted away from the auricle, and guide each of the reflected rearward sound and the reflected forward scattering sound, as a reflected forward sound, toward the external acoustic meatus of the auricle from the front of the auricle.

7. The headphone according to claim 6, wherein (iii) a central sound radiated from a center of the diaphragm toward the auricle, and (iv) a radiated forward sound radiated toward the auricle from the diaphragm at the front of the auricle are directly guided to the external acoustic meatus of the auricle.

8. The headphone according to claim 6, wherein:

the audio image controller further includes a main body having an outer periphery corresponding to the diaphragm to cover a part of the diaphragm in a dome shape, and an opening configured to be located from an area around a center of the auricle to the front of auricle;

a part of the main body, configured to be at to the rear of the auricle and covering the diaphragm in the dome shape, serves as the rear insulating plate; and the reflecting plate is erected from the main body, having the opening intervening between the reflecting plate and the main body.

9. The headphone according to claim 6, wherein the diaphragm extends in a first direction, the reflecting plate is erected in a second direction perpendicular to the first direction, and the rear insulating plate overlaps (a) the diaphragm in the second direction and (b) the reflecting plate in the first direction.

10. A headphone attachment configured to be installed on a headphone/speaker having an earpad configured to surround an auricle of the user using the headphone/speaker, and to control localization of an audio image in a space between the headphone/speaker and the auricle, the headphone attachment comprising:

a rear insulating plate disposed within an inner periphery of the earpad to be at a first position between a rear of the auricle and the diaphragm, inclined with respect to the diaphragm, and configured to insulate a rearward sound radiated toward the auricle from the diaphragm as an acoustic radiation surface of the headphone/speaker at the rear of the auricle, and reflect the rearward sound back toward a front of the auricle, wherein the front of the auricle is defined as a side with a face of the user; and a reflecting plate disposed within the inner periphery of the earpad to be at a second position between the front of the auricle and the diaphragm, and configured to reflect (i) the reflected rearward sound reflected by the rear insulating plate, and (ii) a forward scattering sound radiated from the diaphragm at the front of the auricle to be transmitted away from the auricle, and guide each of the reflected rearward sound and the reflected forward scattering sound, as a reflected forward sound, toward the external acoustic meatus of the auricle from the front of the auricle.

11. The headphone attachment according to claim 10, wherein (iii) a central sound radiated from a center of the diaphragm toward the auricle, and (iv) a radiated forward sound radiated toward the auricle from the diaphragm at the front of the auricle are directly guided to the external acoustic meatus of the auricle.

12. The headphone attachment according to claim 11, further comprising:

a main body having an outer periphery corresponding to the diaphragm to cover a part of the diaphragm in a dome shape, and an opening configured to be located from an area around a center of the auricle to the front of the auricle, wherein:

a part of the main body, configured to be at the rear of the auricle and covering the diaphragm in the dome shape, serves as the rear insulating plate; and the reflecting plate is erected from the main body, having the opening intervening between the reflecting plate and the main body.

13. The headphone attachment according to claim 12, wherein a margin region is formed on the outer periphery of the main body, having at least partially cut in accordance with a size of a commercial headphone.

14. The headphone attachment according to claim 12, wherein the main body is held through insertion between the diaphragm and the earpad.

15. The headphone attachment according to claim 10, wherein the diaphragm extends in a first direction, the reflecting plate is erected in a second direction perpendicular to the first direction, and the rear insulating plate overlaps (a) the diaphragm in the second direction and (b) the reflecting plate in the first direction.

* * * * *